(12) United States Patent
Sahashi

(10) Patent No.: US 10,279,715 B2
(45) Date of Patent: May 7, 2019

(54) VEHICLE SEAT

(71) Applicant: TOYOTA BOSHOKU KABUSHIKI KAISHA, Aichi-ken (JP)

(72) Inventor: Hideo Sahashi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/885,224

(22) Filed: Jan. 31, 2018

(65) Prior Publication Data
US 2018/0229635 A1 Aug. 16, 2018

(30) Foreign Application Priority Data

Feb. 14, 2017 (JP) .................................. 2017-024689

(51) Int. Cl.
*B60N 2/58* (2006.01)
*B60N 2/02* (2006.01)
*B60N 2/70* (2006.01)

(52) U.S. Cl.
CPC ............ *B60N 2/5891* (2013.01); *B60N 2/02* (2013.01); *B60N 2/7035* (2013.01)

(58) Field of Classification Search
CPC ....... B60N 2/5891; B60N 2/02; B60N 2/7035

USPC ...................................... 297/452.59, 452.61
See application file for complete search history.

(56) References Cited

U.S. PATENT DOCUMENTS 8,944,515 B2 * 2/2015 Kono ....................... B60N 2/64
297/452.59 X
2011/0156467 A1 * 6/2011 Murata ................ B60N 2/7017
297/452.48

FOREIGN PATENT DOCUMENTS

JP 4919640 2/2012

* cited by examiner

*Primary Examiner* — Anthony D Barfield
(74) *Attorney, Agent, or Firm* — Greenblum & Bernstein, P.L.C.

(57) ABSTRACT

A vehicle seat including: a seat frame; a seat pad covering the seat frame, a back surface of the seat pad including a seat frame covering part that covers the seat frame; and a back surface material made of cloth and covering a part of the seat frame covering part other than an edge of the seat frame covering part, the back surface material being interposed between the seat frame covering part and a surface of the seat frame, wherein, in a state where the seat frame is covered with the seat pad, at least the edge of the seat frame covering part is distanced from the surface of the seat frame.

5 Claims, 7 Drawing Sheets

VEHICLE SEAT

CROSS-REFERENCE TO RELATED APPLICATIONS

This application claims priority from Japanese Patent Application No. 2017-024689 filed on Feb. 14, 2017, the entire contents of which are incorporated herein by reference.

TECHNICAL FIELD

The disclosure relates to a vehicle seat in which a surface of a seat frame is covered with a seat pad, a back surface of the seat pad includes a seat frame covering part that covers the seat frame, and a back surface material which is made of cloth covers the seat frame covering part.

BACKGROUND

A vehicle seat related to the disclosure is described in Japanese Patent No. 4919640. As shown in FIG. 9, the vehicle seat of Japanese Patent No. 4919640 includes a seat cushion 100c and a seat back 100b. As shown in FIGS. 9 and 10, in the seat back 100b, a surface of a back frame 101 is covered with a back pad 103, and a surface of the back pad 103 is covered with a skin 106 (not shown in FIG. 10). As shown in FIG. 10, in a back surface of the back pad 103 (seat frame covering part 103u), a back surface material 104 made of cloth covers a part of the seat frame covering part 103u other than an edge 103e of the seat frame covering part 103u. By interposing the back surface material 104 between the seat frame covering part 103u of the back pad 103 and the surface of the back frame 101, the friction coefficient between the back pad 103 and the back frame 101 can be reduced. As a result, even if the back frame 101 and the back pad 103 rub against each other due to the back pad 103 being displaced with respect to the back frame 101, abnormal noise due to friction can be suppressed to some extent.

Here, the back pad 103 is formed into a predetermined shape by expanding a foam material such as urethane in a molding die. That is, as shown in FIG. 11, a back surface material 104 is set on an inside surface of a first molding die 111. The first molding die 111 is mated with a second molding die 112, and the back pad 103 having the back surface material 104 is formed by expanding a foam material, which is not shown, in a molding space S of a molding die 110. At this time, in order to prevent an edge of the back surface material 104 from being caught in the mold-mating portion 113 between the first molding die 111 and the second molding die 112, the back surface material 104 is set on the inner surface of the first molding die 111 so that the edge of the back surface material 104 is distanced from the mold-mating portion 113 by a predetermined distance. Consequently, as shown in FIG. 10, the edge 103e of the seat frame covering part 103u of the back pad 103 is not covered by the back surface material 104. That is, the edge 103e of the seat frame covering part 103u of the back pad 103 comes into direct contact with the surface of the back frame 101 without the back surface material 104 being interposed therebetween. Consequently, the coefficient of friction between the edge 103e of the back pad 103 (seat frame covering part 103u) and the surface of the back frame 101 increases. As a result, when the back pad 103 is displaced with respect to the back frame 101 and the back frame 101 and the back pad 103 rub against each other, an abnormal noise is generated between the edge 103e of the back pad 103 (seat frame covering part 103u) and the surface of the back frame 101.

SUMMARY

The disclosure provides a vehicle seat in which abnormal noise due to friction between the seat frame and the seat pad is suppressed.

According to an aspect of the disclosure, there is provided a vehicle seat including: a seat frame; a seat pad covering the seat frame, a back surface of the seat pad including a seat frame covering part that covers the seat frame; and a back surface material made of cloth and covering a part of the seat frame covering part other than an edge of the seat frame covering part, the back surface material being interposed between the seat frame covering part and a surface of the seat frame, wherein, in a state where the seat frame is covered with the seat pad, at least the edge of the seat frame covering part is distanced from the surface of the seat frame.

DETAILED DESCRIPTION

Embodiment 1

Figure 1:
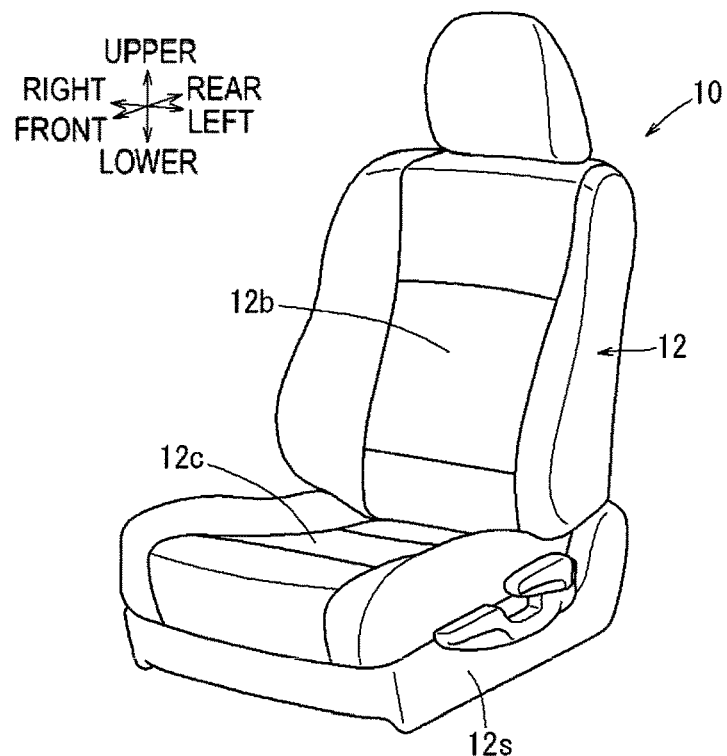
FIG. 1 is a perspective view of a vehicle seat according to embodiment 1 of the disclosure as viewed from a front left direction.

Hereinafter, a vehicle seat according to embodiment 1 of the disclosure will be described with reference to FIGS. 1 to 8. The vehicle seat 10 according to the present embodiment is a seat installed in a passenger compartment of a vehicle. Front, rear, right, left, upper and lower shown in the figures correspond to front, rear, left, right, upper and lower sides of the vehicle seat 10.

<Vehicle Seat 10>

The vehicle seat 10 includes a seat main body 12 on which an occupant sits, and a seat moving device (not shown) for sliding the seat main body 12 back and forth or up and down, etc. within the passenger compartment. The seat main body 12 includes a seat cushion 12c, a seat back 12b, and a frame-shaped shield 12s that covers the seat moving device under the seat cushion 12c.

<Seat Back 12b>

Figure 2:
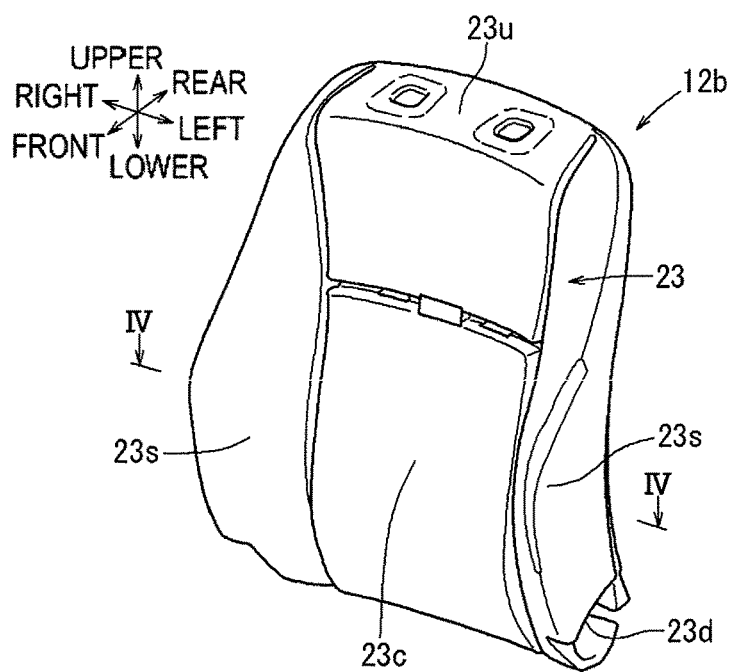
FIG. 2 is a perspective view of a back pad of the vehicle seat as viewed from the front left direction.
Figure 3:
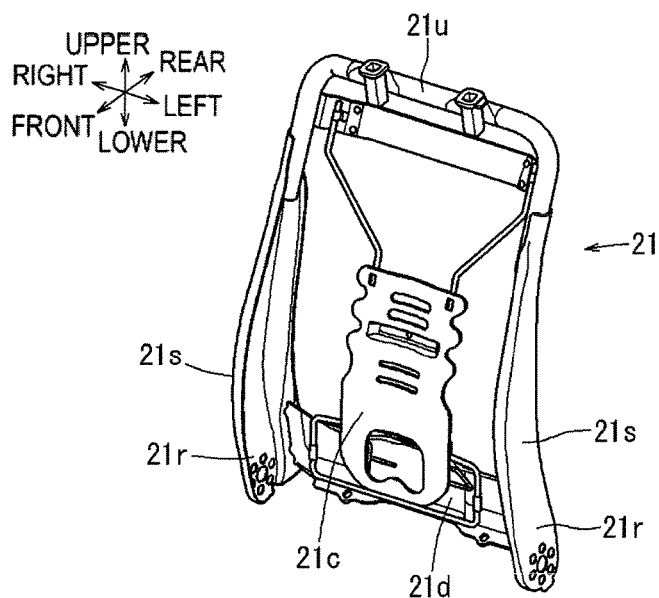
FIG. 3 is a perspective view of a back frame of the vehicle seat as viewed from the front left direction.

As shown in FIGS. 2 and 3, the seat back 12b includes a back frame 21, a back pad 23 made of, for example, urethane, and a skin (not shown) covering a surface of the back pad 23. The back frame 21 is a framework of the seat back 12b and has a rectangular frame shape formed by left and right side frames 21s, an upper frame 21u, and a lower panel 21d, as shown in FIG. 3. A central panel 21c is supported by the upper frame 21u and the lower panel 21d. Recliner attachment portions 21r, to which a recliner (not shown) of the vehicle seat 10 can be attached, are provided at a lower end position of the left and right side frames 21s. The back frame 21 corresponds to the seat frame of the disclosure.

Figure 4:
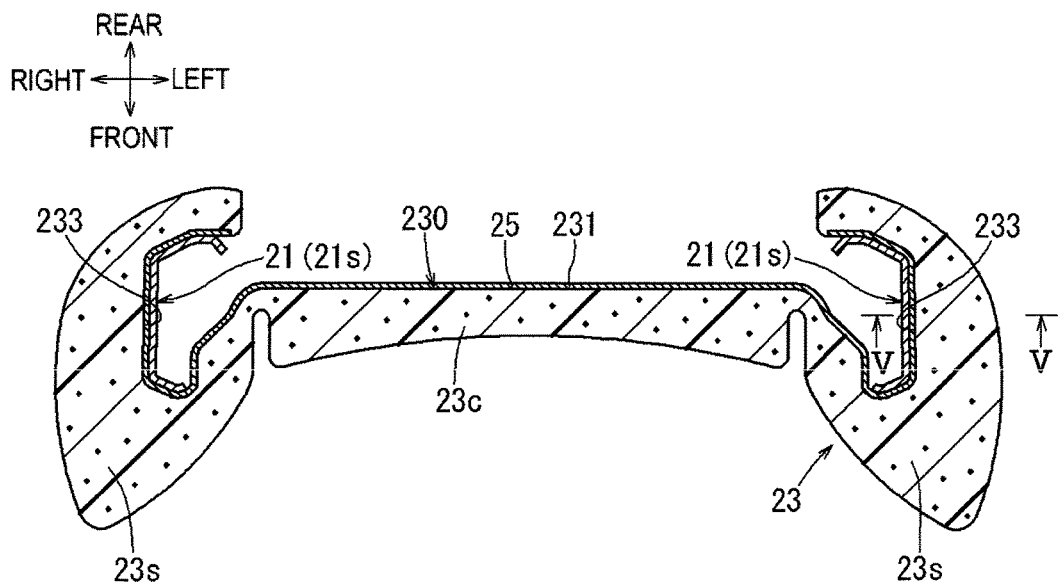
FIG. 4 is a cross-sectional plan view showing a relationship between the back pad and the back frame (i.e., a cross-sectional view taken along IV-IV in FIG. 2)

As shown in FIG. 2, the back pad 23 of the seat back 12b includes a central portion 23c and left and right side portions 23s. As shown in FIG. 4, the back pad 23 covers the back frame 21 such that the left and right side portions 23s of the back pad 23 cover the left and right side frames 21s of the back frame 21 from the outer side in the width direction. Further, the back pad 23 covers the back frame 21 such that an upper portion 23u of the back pad 23 covers the upper frame 21u of the back frame 21 from above. As shown in, for example, FIG. 5, a lower end surface 23d of the left and right side portions 23s of the back pad 23 is disposed higher than the recliner attachment portion 21r of the side frames 21s in a state where the back pad 23 covers the back frame 21.

As shown in FIG. 4, a back surface 230 of the back pad 23 includes a back frame covering part 233 that covers the back frame 21 and an exposed portion 231 that is exposed from the back frame 21. The back surface 230 of the back pad 23 is covered with a back surface material 25. The back surface material 25 is a non-woven fabric and is disposed between the back frame covering part 233 of the back pad 23 and the surface of the back frame 21 so as to reduce the friction coefficient between the back pad 23 and the back frame 21. In a state where the back frame 21 is covered with the back pad 23, exposed portions of the back pad 23 and the back frame 21 are covered with the skin (not shown). That is, the back pad 23 corresponds to the seat pad of the disclosure.

<Molding Die 30 of the Back Pad 23>

Figure 7:
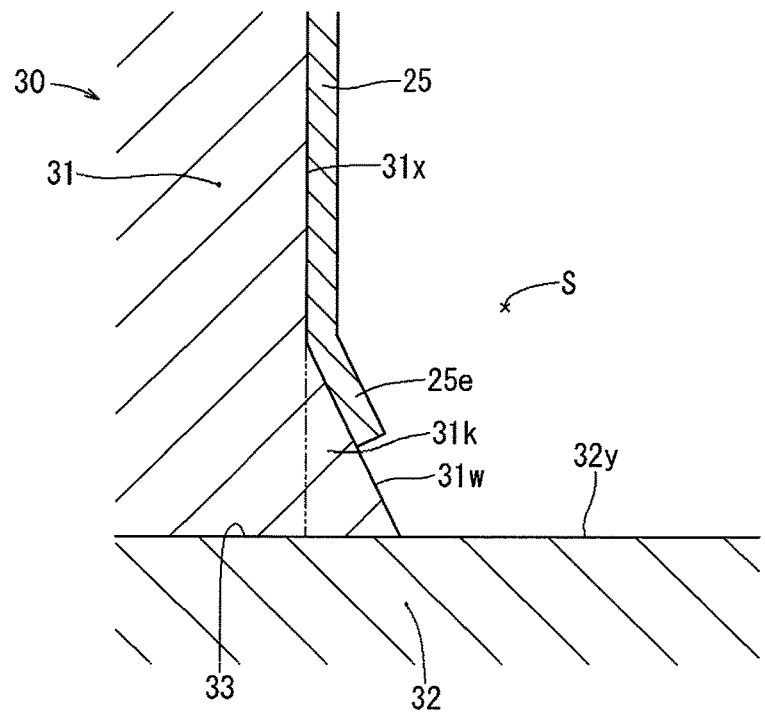
FIG. 7 a vertical cross-sectional view of a portion of a molding die for forming a back pad by which the edge of the seat frame covering part is molded.

The back pad 23 is integrally molded with the back surface material 25 using a molding die 30. As shown in FIG. 7, a molding die 30 has a first molding die part 31 and a second molding die part 32, and by clamping together the first molding die part 31 and the second molding die part 32, a molding space S for a back pad 23 is formed in the molding die 30. The first molding die part 31 has a frame covering molding surface 31x for molding the back frame covering part 233 of the back pad 23. Further, the second molding die part 32 has a lower end molding surface 32y for molding the lower end surface 23d (see FIG. 5) of the back pad 23. A mold-mating portion 33 of the first molding die part 31 and the second molding die part 32 is provided at a position on the extended line of the lower end molding surface 32y of the second molding die part 32.

As shown in FIG. 7, on the frame covering molding surface 31x of the first molding die part 31, a protruding wall portion 31k, protruding into the molding space S, is provided at a position near the mold-mating portion 33 of the molding die 30. The protruding wall portion 31k has an inclined wall shape in which the protrusion amount gradually increases as the protruding wall portion 31k comes near to the mold-mating portion 33. The surface of the protruding wall portion 31k is an inclined wall surface 31w configuring a part of the frame covering molding surface 31x. The first molding die part 31 is configured such that the back surface material 25 can be set at a position of the frame covering molding surface 31x. Here, in order to prevent the edge 25e of the back surface material 25 from being caught by the mold-mating portion 33 when the molding die 30 is clamped together, the edge 25e is set on the frame covering molding surface 31x of the first molding die part 31 with a predetermined distance away from the mold-mating portion 33. That is, the edge 25e of the back surface material 25 is aligned on the inclined wall surface 31w of the protruding wall portion 31k with a predetermined distance away from the mold-mating portion 33.

<Method for Forming the Back Pad 23>

When forming the back pad 23, in a state where the molding die 30 is opened, the back surface material 25 is first set at the position of the frame covering molding surface 31x of the first molding die part 31 as shown in FIG. 7. That is, the back surface material 25 is fixed at a predetermined position on the frame covering molding surface 31x of the first molding die part 31 by hooks or the like. At this time, the edge 25e of the back surface material 25 is held on the inclined wall surface 31w of the protruding wall portion 31k of the first molding die part 31. Next, a foam material such as urethane is set in the molding space S of the molding die 30, and the first molding die part 31 and the second molding die part 32 are clamped together. Then, by the foaming of the foam material, the back pad 23 is molded by the molding die 30 so that the back surface 230 of the back pad 23, that is, the back frame covering part 233, and the exposed portion 231 is covered with the back surface material 25.

Figure 5:
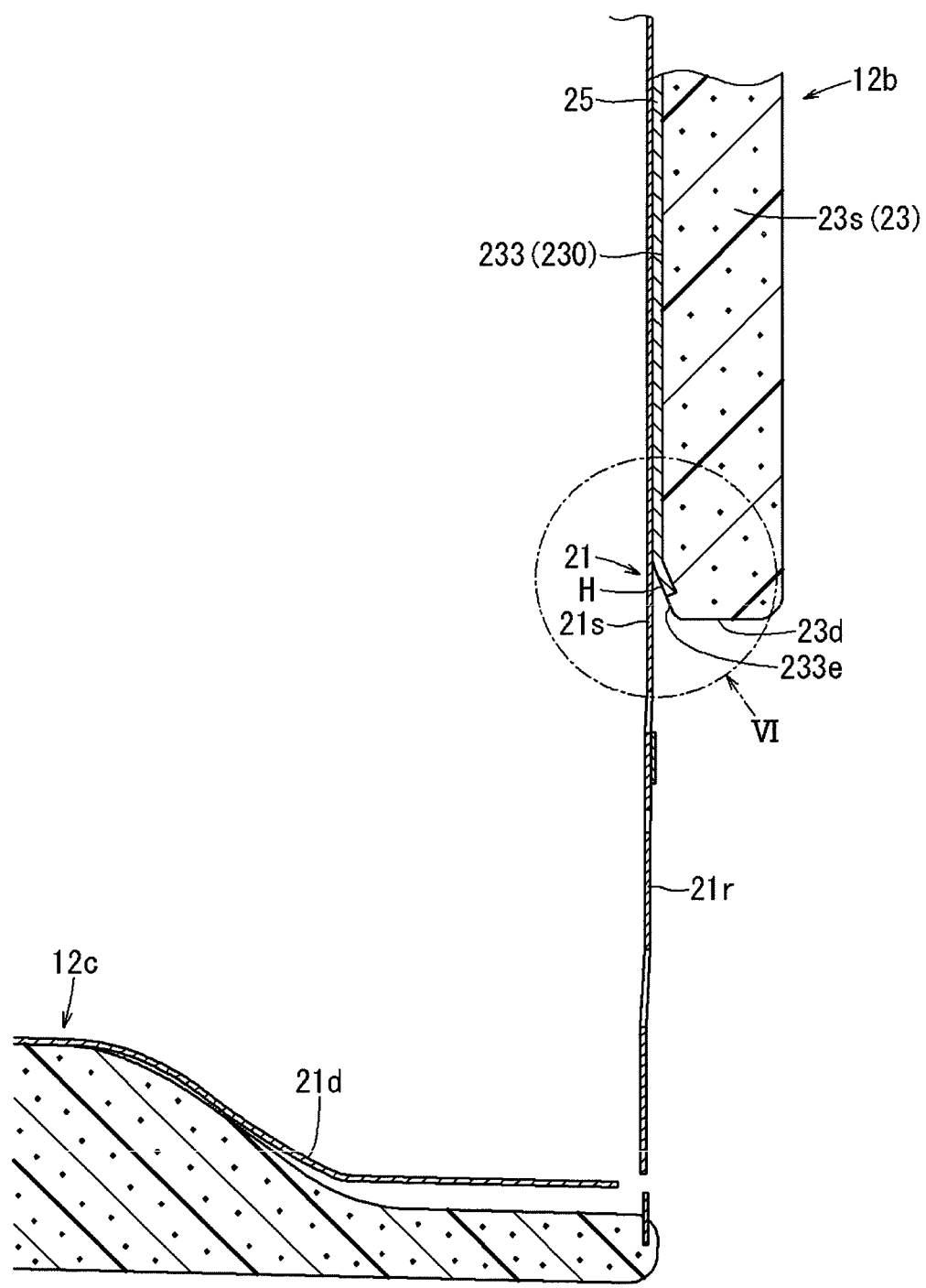
FIG. 5 is a vertical cross-sectional view showing a relationship between an edge of a seat frame covering part of the back pad and a surface of the back frame (i.e., a cross-sectional view taken along V-V in FIG. 4)
Figure 6:
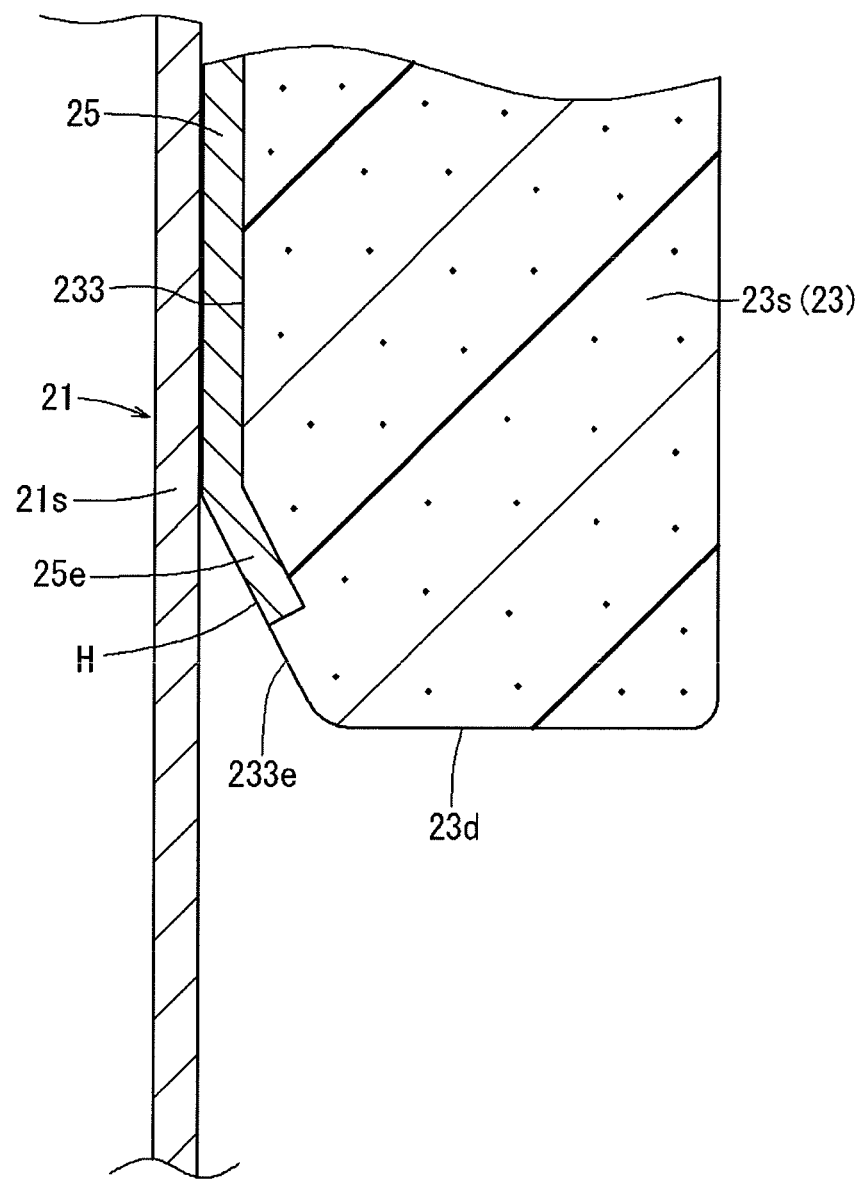
FIG. 6 is an enlarged view of an area denoted by an arrow VI in FIG. 5.

Here, as shown in FIG. 7, the protruding wall portion 31k is provided on the frame covering molding surface 31x of the first molding die part 31, and the edge 25e of the back surface material 25 is held on the inclined wall surface 31w. As a result, as shown in FIGS. 5 and 6, at a corner of the back frame covering part 233 and the lower end surface 23d of the back pad 23, a recessed portion H, which is chamfered, is formed at a position corresponding to the protruding wall portion 31k of the first molding die part 31 (the frame covering molding surface 31x). Here, since the edge 25e of the back surface material 25 is held a predetermined distance away from the mold-mating portion 33, the edge 233e of the back frame covering part 233 of the back pad 23 is not covered with the back surface material 25. However, the edge 233e of the back frame covering part 233 of the back pad 23 is at the position of the recessed portion H which is distanced from the surface of the back frame 21 (the side frame 21s; see FIG. 5, etc.). Therefore, the edge 233e of the back pad 23 (the back frame covering part 233) does not come into contact with the surface of the back frame 21 (the side frame 21s). That is, the back frame covering part 233 of the back pad 23 is brought into contact with the surface of the back frame 21 entirely through the back surface material 25. Consequently, even if the back pad 23 and the back frame 21 rub against each other, abnormal noise is hardly generated between the back frame 21 and the back pad 23.

<Advantages of the Vehicle Seat 10 According to the Present Embodiment>

According to the vehicle seat 10 of the present embodiment, in a state where the surface of the back frame 21 (the seat frame) is covered with the back pad 23 (the seat pad), at least the edge 233e of the back frame covering part 233 of the back pad 23 is distanced from the surface of the back frame 21. That is, the edge 233e of the back frame covering part 233 of the back pad 23 which is not covered with the back surface material 25 does not come into contact with the surface of the back frame 21. Therefore, the back frame covering part 233 of the back pad 23 is brought into contact with the surface of the back frame 21 entirely through the back surface material 25. Consequently, even if the back pad 23 and the back frame 21 rub against each other, abnormal noise is hardly generated between the back frame 21 and the back pad 23.

Further, the edge 25e of the back surface material 25 is configured to cover a portion of the recessed portion H of the back pad 23 (the back frame covering part 233). As a result, it becomes possible to handle variations in the size of the back surface material 25 at a position of the recessed portion H of the back pad 23. Further, the recessed portion H of the back pad 23 is chamfered at the corner of the back frame covering part 233 and the lower end surface 23d. Therefore, it becomes easy to mold the recessed portion H of the back pad 23. Further, a surface of the edge 233e of the back frame covering part 233 of the back pad 23 is flush with a surface of the edge 25e of the back surface material 25.

<Modifications>

Figure 8:
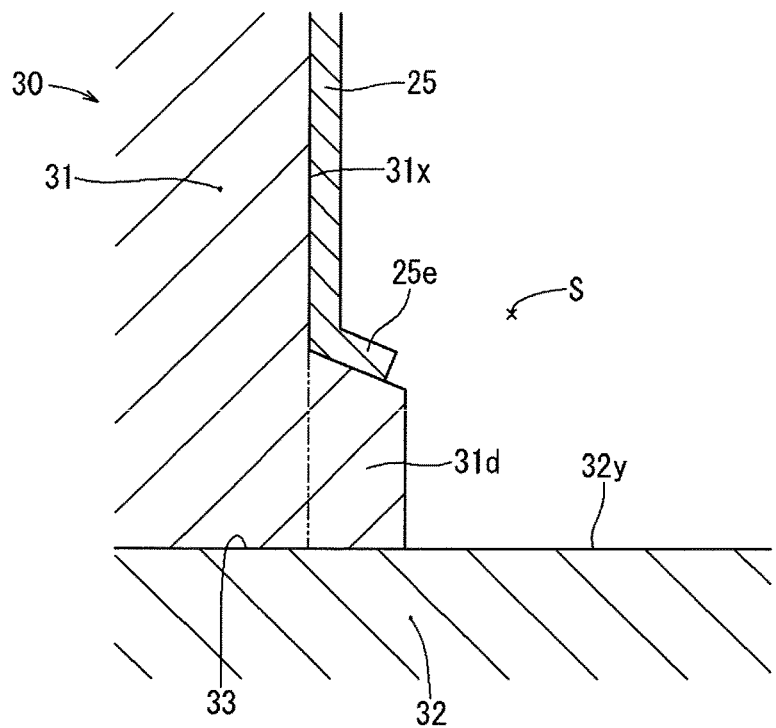
FIG. 8 is a vertical cross-sectional view of a portion of a molding die, according to a modification, in which the edge of the seat frame covering part is molded.
Figure 9:
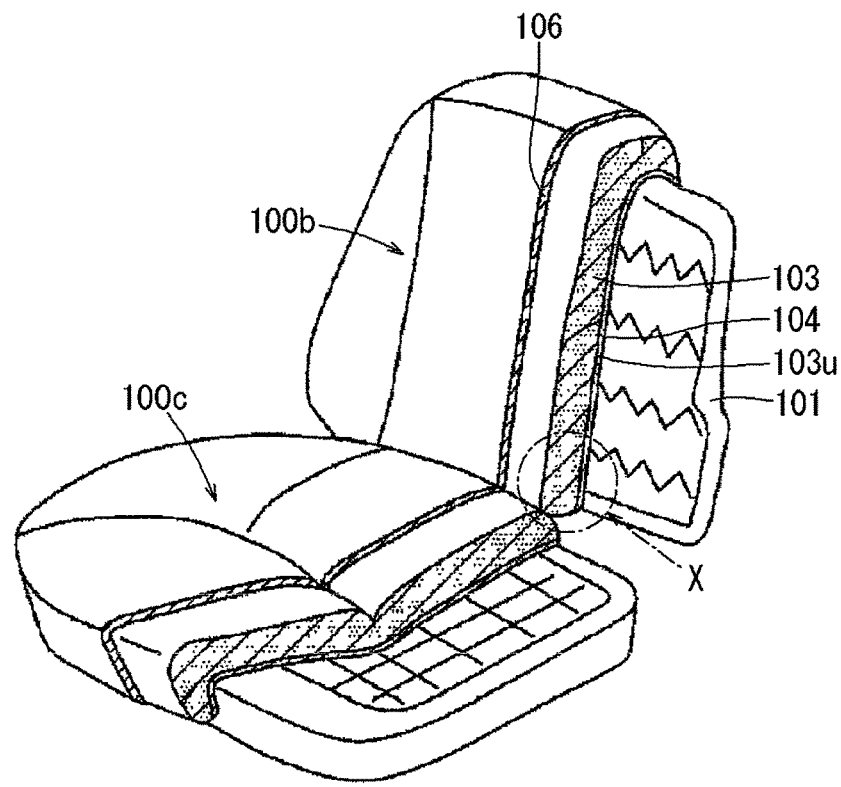
FIG. 9 is a broken perspective view of a vehicle seat according to related art.
Figure 10:
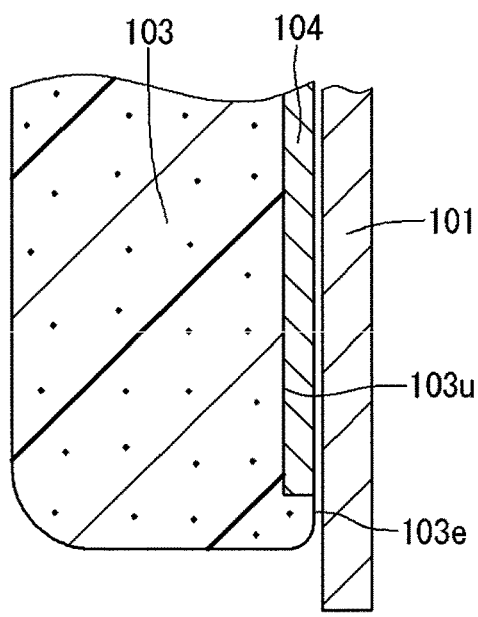
FIG. 10 is an enlarged view of an area denoted by an arrow X in FIG. 9.
Figure 11:
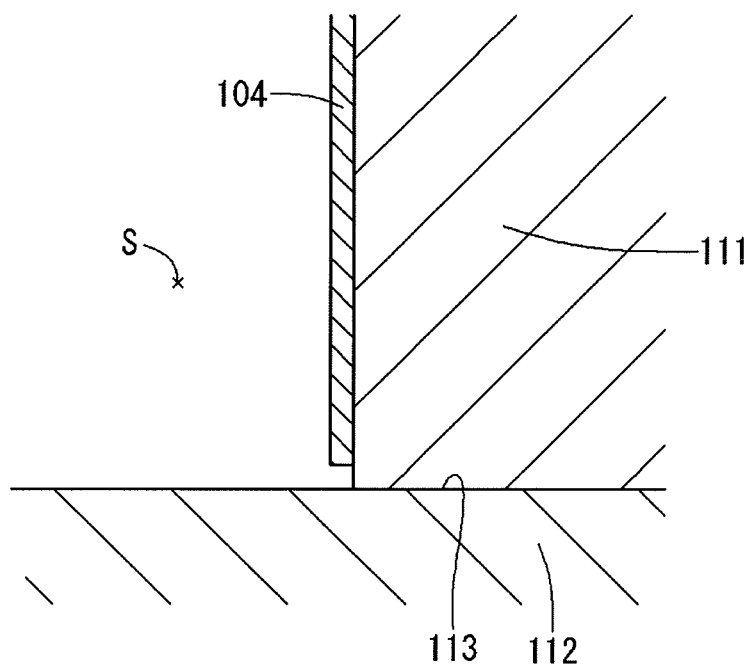
FIG. 11 is a vertical cross-sectional view of a portion of a molding die for forming a back pad according to related art, by which an edge of a seat frame covering part is formed.

Here, the disclosure is not limited to the above-described embodiment, and modifications can be made within a scope not deviating from the spirit of the disclosure. For example, in the present embodiment, as shown in FIG. 7, a protruding wall portion 31k in the shape of an inclined wall surface is formed on the frame covering molding surface 31x of the first molding die part 31, and a recessed portion H having a chamfered shape (an inclined surface shape) is formed at the corner of the back frame covering part 233 of the back pad 23 and the lower end surface 23d. However, as shown in FIG. 8, a stepped protruding wall portion 31d can be formed on the frame covering molding surface 31x of the first molding die part 31 so as to form a stepped recessed portion in the back frame covering part 233 of the back pad 23. Further, the present embodiment has been illustrated with the seat back 12b of the vehicle seat 10, but the disclosure can also be applied to a seat cushion 12c. Further, in this embodiment, an example in which the recessed portion H is formed in the back frame covering part 233 of the back pad 23 by the protruding wall portion 31k, 31d of the molding die 30 (the first molding die part 31) is shown. However, the protruding wall portions 31k, 31d of the molding die 30 (the first molding die part 31) can be omitted, and the corner of the back frame covering part 233 and the lower end surface 23d of the back pad 23 after the molding can be processed with a cutter or the like to form a chamfered recessed portion H.

The disclosure provides illustrative, non-limiting examples as follows:

According to a first aspect of the disclosure, there is provided a vehicle seat including: a seat frame; a seat pad covering the seat frame, a back surface of the seat pad including a seat frame covering part that covers the seat frame; and a back surface material made of cloth and covering a part of the seat frame covering part other than an edge of the seat frame covering part, the back surface material being interposed between the seat frame covering part and a surface of the seat frame, wherein in a state where the seat frame is covered with the seat pad, at least the edge of the seat frame covering part is distanced from the surface of the seat frame.

Accordingly, in a state where the seat frame is covered with the seat pad, at least the edge of the seat frame covering part is distanced from the surface of the seat frame. That is, the edge of the seat frame covering part of the seat pad which is not covered with the back surface material does not come into contact with the surface of the seat frame. As a result, the seat frame covering part of the seat pad is brought into contact with the surface of the seat frame entirely through the back surface material. Consequently, even if the seat frame and the seat pad rub against each other due to the seat pad being displaced with respect to the seat frame, abnormal noise is hardly generated between the seat frame and the seat pad.

According to a second aspect of the disclosure, there it provided the vehicle seat according to the first aspect, wherein an edge of the back surface material covers a part of the seat frame covering part that is distanced from the surface of the seat frame.

As a result, it becomes possible to handle variations in the size of the back surface material at the part of the seat frame covering part that is distanced from the surface of the seat frame.

According to a third aspect of the disclosure, there is provided the vehicle seat according to the first or second aspect, wherein a part of the seat frame covering part that is distanced from the surface of the seat frame is formed by chamfering a corner portion of the seat pad.

As a result, it becomes easy to mold the part of the seat frame covering part that is distanced from the surface of the seat frame.

According to a fourth aspect of the disclosure, there is provided the vehicle seat according to any one of the first to third aspects, wherein the seat pad is integrally formed with the back surface material.

According to the disclosure, abnormal noise generated by friction between the seat frame and the seat cushion can be suppressed.

According to a fifth aspect of the disclosure, there is provided the vehicle seat according to any one of the first to fourth aspects, wherein the seat frame covering part is brought into contact with the surface of the seat frame entirely through the back surface material.

According to a sixth aspect of the disclosure, there is provided the vehicle seat according to any one of the first to fifth aspects, wherein a surface of the edge of the seat frame covering part is flush with a surface of an edge of the back surface material.

What is claimed is:

1. A vehicle seat comprising:
   a seat frame extending in an extension direction;
   a seat pad covering the seat frame along the extension direction, a back surface of the seat pad including a seat frame covering part that covers the seat frame; and
   a back surface material made of cloth and covering a part of the seat frame covering part other than an edge of the seat frame covering part, the back surface material being interposed between the seat frame covering part and a surface of the seat frame,
   wherein the seat pad includes recessed portion that recesses away from the extension direction of the seat frame so as to be distanced from the surface of the seat frame,
   wherein, in a state where the seat frame is covered with the seat pad, the recessed portion including the edge of the seat frame covering part recesses away from the surface of the seat frame so as to be distanced from the surface of the seat frame, and
   wherein an edge of the back surface material extends to cover a part of the recessed portion.

2. The vehicle seat according to claim 1,
wherein the recessed portion is formed by chamfering a corner portion of the seat pad.

3. The vehicle seat according to claim 1,
wherein the seat pad is integrally formed with the back surface material.

4. The vehicle seat according to claim 1,
wherein the seat frame covering part is brought into contact with the surface of the seat frame entirely through the back surface material.

5. The vehicle seat according to claim 1,
wherein a surface of the edge of the seat frame covering part is flush with a surface of an edge of the back surface material.

* * * * *